Dec. 8, 1964   J. W. HAAS ETAL   3,160,801
WOUND CAPACITOR AND METHOD OF MAKING
Filed Jan. 2, 1958   2 Sheets-Sheet 1

JOHN W. HAAS
GORDON F. CONNELLY
HAROLD R. VAN VOORHIS
INVENTORS

BY R. Frank Smith
Paul R. Holmes
ATTORNEYS

JOHN W. HAAS
GORDON F. CONNELLY
HAROLD R. VAN VOORHIS
INVENTORS

ATTORNEYS

United States Patent Office 3,160,801
Patented Dec. 8, 1964

3,160,801
WOUND CAPACITOR AND METHOD OF MAKING
John W. Haas, Gordon F. Connelly, and Harold R. Van Voorhis, Rochester, N.Y., assignors to Eastman Kodak Company, Rochester, N.Y., a corporation of New Jersey
Filed Jan. 2, 1958, Ser. No. 706,846
16 Claims. (Cl. 317—258)

This invention relates to electric capacitors and to methods of making the capacitors. More particularly, the present invention relates to the making of a wound capacitor formed of planar molecularly oriented linear thermoplastic polyester films and interleaved metal foils and heat-treating the wound capacitor causing the plastic dielectric films to shrink, to partially disorient, and to fuse on the exposed ends thereof to thereby produce a hard unit offering an excellent barrier to the penetration of moisture.

It is known to utilize planar molecularly oriented linear thermoplastic polyester films such as, for example, polyethylene terephthalate for the dielectric spacing sheets in wound capacitors as is illustrated in U.S. Patent 2,735,970, recently granted in the name of D. B. Peck and P. Robinson on February 21, 1956. The capacitors produced in accordance with the disclosure of the above noted patent are not fully satisfactory and sometimes fail to meet the rigid specifications required by the Government in the manufacture of numerous ordnance devices such as VT fuses and guided missiles. More particularly, it has been found that the capacitors made in accordance with the Peck et al. patent lack sufficient physical rigidity and are consequently subject to an undesirable amount of noise, that the capacitor terminals have an insufficient pull-out strength and that the capacitor is subject to attack by air and moisture through the ends of the capacitor. The electric capacitor of the present invention was designed to improve on the characteristics of the wound capacitors of the known prior art and to meet or surpass the exacting requirements of certain Government specifications.

The primary object of the present invention is, therefore, to provide an improved electric capacitor comprising wound planar molecularly oriented linear thermoplastic polyester films interleaved with suitable metal foils.

Another object of the present invention is to provide a wound capacitor which is a hard and rugged unit requiring neither impregnation nor incasement and offering an excellent barrier to the penetration of moisture.

Still another object of the present invention is to provide a wound capacitor formed of planar molecularly oriented linear thermoplastic polyester films and interleaved metal foils said capacitor having been heat-treated at an elevated temperature for a period of time sufficient to shrink the polyester films and to permit only a partial disorientation thereof and causing the fusion of the films on the ends of the capacitor to provide a sealed unit offering an excellent barrier to penetration of moisture.

Yet another object of the present invention is to provide a wound capacitor comprising wire terminals coated on one end with a heat sensitive adhesive inserted between planar molecularly oriented linear thermoplastic polyester films with interleaved metal foils and heat-treated at an elevated temperature for a period of time sufficient to shrink the dielectric polyester films and to permit only a partial disorientation thereof and to cause a fusing of the adhesive on the wire terminals to securely bond the terminals to the appropriate metal foil electrodes and adjacent polyester films, and to cause a fusion of the films on the exposed ends of the capacitor to provide a sealed unit offering an excellent barrier to penetration of moisture.

Still another object of the present invention is to provide a method of making an electric capacitor which comprises enrolling into a wound capacitor interleaved strips of metal foils and planar molecularly oriented linear thermoplastic polyester films, and heating the wound capacitor for a period of time sufficient to cause a shrinkage of the dielectric polyester films and only a partial disorientation thereof and causing a fusion of the films on the exposed ends of the capacitor.

Yet another object of the present invention is to provide a method of making an electric capacitor which comprises enrolling into a wound capacitor interleaved strips of metal foils and planar molecularly oriented linear thermoplastic polyester films, inserting during the winding of the capacitor terminal wires coated with a heat sensitive adhesive on one end thereof, and heating the wound capacitor for a period of time sufficient to shrink the plastic films and to cause only a partial disorientation thereof, causing the adhesive to bond the terminals to the appropriate metal foil electrodes and adjacent dielectric polyester films and causing a fusion of the plastic films on the ends of the capacitors.

Other objects and advantages of the present invention will become readily apparent to those skilled in the art from the following description with reference to the drawings in which like characters denote like parts and wherein.

Figure 1:
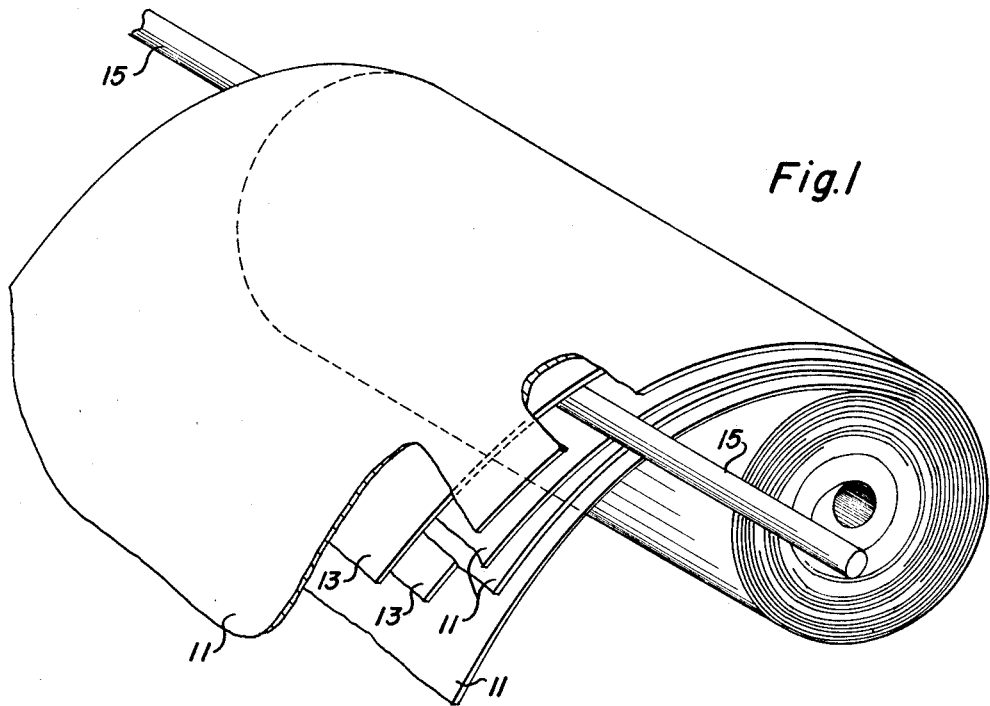
FIG. 1 is an enlarged perspective view illustrating the relative positions of the interleaved dielectric and foil sheets and the terminals forming the capacitor.

Referring to FIG. 1, the wound capacitor of the present invention utilizes planar molecularly oriented linear thermoplastic polyester films 11 conforming to the recurrent formula:

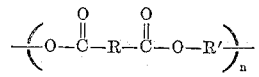

in which R stands for a bivalent radical containing the benzene nucleus, and R' stands for a bivalent aliphatic radical containing from 2 to 8 carbon atoms to shrink when heated to a temperature sufficient to relax or partially disorient their planar molecular orientation. The preferred polyester used in accordance with the present invention is a linear condensation polymer of terephthalic acid and ethylene glycol sold under the trade name "Mylar." Other polyesters conforming to the above noted general formula and acceptable for use in the practice in the present invention are the condensation polymers of terephthalic acid and various alkane diols such as propylene glycol, butylene glycol, or 1,4-cyclohexanedimethanol, etc. and the condensation polymers of the chlorinated or otherwise substituted dibasic aromatic acids with substituted and unsubstituted glycols. The preferred starting materials are those which condense to form a linear readily oriented chain and for this reason p-substituted aromatic compounds are preferred to meta-substituted compounds. The desired planar orientation is most frequently obtained during manufacture of the films at which time the films are stretched in two directions at a temperature below the relaxation temperature. As hereinafter used in the specification and claims, the term "planar orientation" is intended to define the orientation of the molecules in two directions. Interleaved with the thermoplastic polyester films 11 are the metal foils 13 which form the electrodes of the capacitor. As is well known in the art, the thermoplastic polyester films 11 are wider and longer than the interleaved metal foils 13 and serve to insulate the foils 13 from each other. For reasons which will be hereinafter explained, it is desirable to have the thermoplastic polyester films 11 overlap the adjacent metal electrodes by a substantial amount. During the course of the winding of the capacitor, the wire terminals 15 are each inserted in contact with one of the appropriate metal foils 13 with a substantial portion of the terminal protruding from the opposed ends of the capacitor. The end portion of the terminals 15 which is inserted within the capacitor during winding thereof, is coated as indicated at 17 to a thickness of from .0005 to .003 inch with a thermoplastic adhesive such as for example, a solution of 25% nylon, 25% water and 50% ethyl alcohol by weight or with a thermosetting adhesive such as for example, Epon 1001 made by Shell Oil Company, prepared as recommended by the manufacturer. Epon 1001 is one of several epoxide resins which represent a class of condensation polymers having the typical structure:

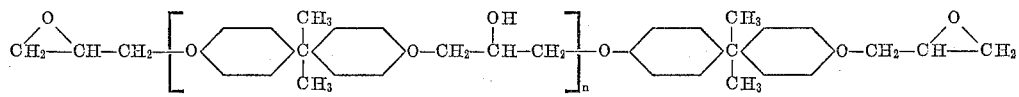

Epon 1001 has an epoxide equivalent of 450 to 525 grams of resin containing 1 gram equivalent of epoxide and a melting point of approximately 64° to 76° C. The heat sensitive adhesive 17 is utilized to bond the terminals to the appropriate metal foil 13 and adjacent thermoplastic polyester film 11, as hereinafter more fully described. In order to insure a good electrical contact between the terminal 15 and the metal foil 13, we prefer to coat the adhesive 17 on the end of the terminal 15 leaving an intermediate area 19 uncoated. After the terminals 15 have been inserted into the capacitor, the winding of the interleaved thermoplastic polyester films 11 and metal foils 13 is continued until the desired amount of capacitance is obtained. The metal foils 13 are then cut off and the thermoplastic polyester films 11 are wound around the capacitor for a few extra turns in order to provide an exterior cover for the capacitor.

Figure 2:
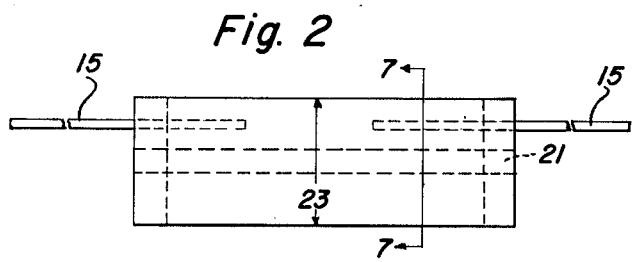
FIG. 2 and FIG. 3 are a side elevation view and an end view respectively of the wound capacitor showing the relative shape of the capacitor prior to the heat treatment thereof.
Figure 3:
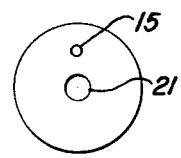
Figure 7:
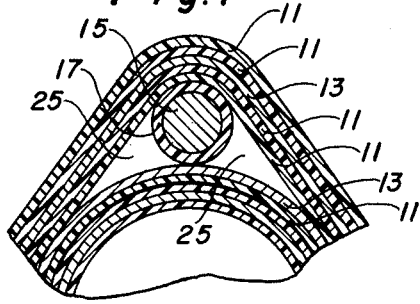
FIG. 7 is a cross-sectional view taken along line 7—7 of FIG. 2.

FIGS. 2 and 3 illustrate the shape of the wound capacitor after it has been removed from the winding arbor. The relative amount of overlap of the thermoplastic polyester films 11 is indicated in FIG. 2 by the dotted lines. The capacitor at this point in its manufacture is relatively loosely wound having a relatively large center aperture 21 and a relatively large overall diameter as indicated at 23. As illustrated in FIG. 7, the terminal 15 with the heat sensitive adhesive coating 17 is held in position by the adjacent convolutions of thermoplastic polyester films 11 and metal foils 13. It will be noted that a relatively large void 25 exists on opposite sides of the terminal 15 because of the obstruction presented by the terminal.

Figure 4:
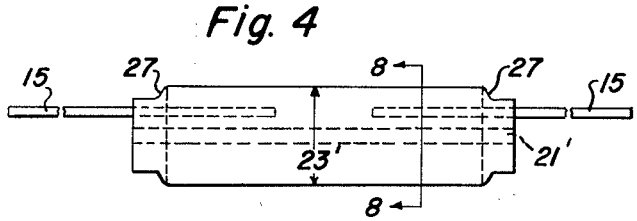
FIG. 4 and FIG. 5 are a side elevation view and an end view respectively of the wound capacitor showing the relative shape of the capacitor after the heat treatment thereof.
Figure 5:
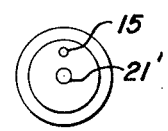
Figure 6:
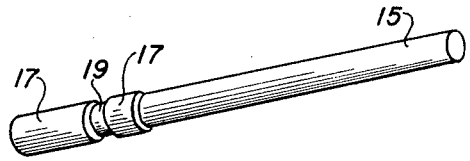
FIG. 6 is a perspective view of one of the wire terminals utilized in the capacitor.
Figure 8:
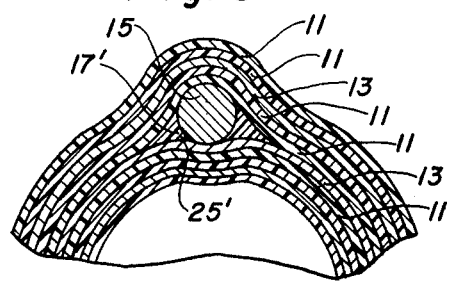
FIG. 8 is a cross-sectional view taken along line 8—8 of FIG. 4.

In order to obtain the high quality characteristics which the capacitors of the present invention provide, the wound capacitors are subjected to a heat treatment in a suitable chamber or oven (not shown). The exact temperature and treatment time required to obtain optimum capacitor characteristics depends upon the physical and electrical dimensions of the capacitor. The most beneficial temperatures for the heat treatment of the various different size capacitors range from 227° C. to approximately 247° C. and the length of treatment time ranges from ½ to not over 10 min. By way of example, we have obtained most satisfactory results with a .001 microfarad capacitor having a diameter after heat treatment of .175 inch and formed of two .0002 inch aluminum foils and four ½ mil Mylar films by heat treatment for 1 min. at a temperature of 243° C. Similarly a .04 microfarad capacitor having a diameter after heat treatment of .240 inch and formed of two .00017 inch aluminum foils and one .00035 and two .0025 inch Mylar films was found to give optimum characteristics when heat treated for 2 min. at a temperature of 243° C. The heat treatment causes the thermoplastic polyester films 11 to shrink and results in a reduction in the diameter of the center aperture 21 and of the overall diameter 23, as indicated at 21' and 23' respectfully in FIGS. 4 and 5. The shrinkage of films 11 also causes the terminal 15 to be tightly retained within the capacitor. The relatively high temperature heat treatment also causes the edges of the thermoplastic polyester films 11 on the ends of the capacitor to fuse as indicated at 27 (slightly exaggerated) in FIG. 4. The term fuse or fusion as used in the specification and claims with reference to the planar molecularly oriented linear thermoplastic polyester films 11 is intended to define the condition of surface fusion which occurs between adjacent films 11. It should be understood that the temperature and period of treatment for the capacitors is not sufficient to completely melt the films 11 throughout the capacitor and such a melting is not desirable. The adjacent surfaces of films 11 are fused, however, and thus a solid and impervious end surface on the capacitors is obtained. The heat treatment of the capacitor also causes the heat sensitive adhesive 17 on the terminal 15 to fuse with the result that the melted adhesive 17' flows into the voids 25 previously existing along each side of the terminal 15 thereby filling the voids 25' and bonding the terminal 15 to the adjacent metal foil 13 and thermoplastic polyester film 11, as shown in FIG. 8. It will be appreciated that the volume of the voids 25' is greatly reduced as a result of the shrinkage of the thermoplastic polyester film 11 during the heat treatment, and the adhesive 17' is thus able to completely fill the voids. The shrinking of the thermoplastic polyester films 11 also results in the elimination of air spaces between the interleaved thermoplastic polyester films 11 and metal foils 13 of the capacitor, thereby permitting a relatively high capacitance to be obtained.

The heat treatment of the capacitor as described above distinguishes the capacitor of the present invention from that disclosed in the above-mentioned Peck et al. patent and results in the obtaining of the vastly improved characteristics. In the specification of the Peck patent, it is stated that the temperature range used for heat treating the wound capacitor is critical and must be maintained between 165–218° C. and for a period of about 30 minutes. Heat treatment at that temperature and for that period of time is specified for relaxing the planar orientation of the thermoplastic polyester films and obtaining the desired shrinkage thereof. We have found, however, that while it is desirable to obtain shrinkage of the thermoplastic polyester films, that it is undesirable to permit the thermoplastic polyester films to become molecularly disoriented. As the thermoplastic polyester films become more and more disoriented they become very brittle and the electrical properties are such that the maximum capacitance obtainable is sharply decreased. The heat treatment of the capacitors in accordance with the present invention is designed, therefore, to obtain the desired amount of shrinkage of the thermoplastic polyester films but to permit only a partial planar disorientation of not greater than 50 percent of the molecules of the films. At the relatively high temperatures specified, it is extremely important therefore that the capacitors not be subjected to the heat treatment for longer periods than that necessary to obtain the desired amount of shrinkage, because further treatment would result in a complete disorientation of the molecules causing embrittlement, a reduction in the voltage breakdown strength and a lowering of the capacitance of the capacitors. The relatively high temperature heat treatment has the further effect of fusing the exposed portions of the thermoplastic polyester films 11 to provide a hard and sealed unit. Thus no encasing nor impregnation of the capacitors made in accordance with the present invention is required even though the capacitors are to be used under adverse conditions of humidity or actual immersion.

The following data is provided in order to further illustrate the present invention and the effect of the heat treatment on the wound capacitors made in accordance therewith. This data was obtained by heat treating a .02 microfarad capacitor having a diameter after heat treatment of .200 inch and made from two .0002 inch aluminum foils and four .00025 inch Mylar films at the various indicated temperatures for the various indicated periods of time.

| Treatment | | Breakdown Strength, D.C. Voltage | | | | | |
|---|---|---|---|---|---|---|---|
| Temp., C. | Period, Min. | 1 | 2 | 3 | 4 | 5 | Average |
| 227 | 1 | 3,450 | 3,800 | 2,900 | 3,100 | 4,200 | 3,490 |
| 232 | 1 | 3,800 | 3,400 | 2,300 | 2,900 | 3,700 | 3,220 |
| 238 | 1 | 3,600 | 3,700 | 2,800 | 2,700 | 3,300 | 3,220 |
| 243 | 1 | 2,400 | 3,100 | 3,200 | 2,600 | 2,950 | 2,850 |
| 227 | 2 | 4,500 | 2,900 | 3,750 | 3,700 | 4,600 | 3,890 |
| 232 | 2 | 3,450 | 3,100 | 3,800 | 3,900 | 3,800 | 3,610 |
| 238 | 2 | 3,200 | 3,800 | 650 | 3,400 | 3,300 | 2,870 |
| 243 | 2 | 2,300 | 1,100 | 2,800 | 4,100 | 4,200 | 2,900 |
| 227 | 3 | 4,600 | 3,300 | 4,200 | 4,100 | 4,550 | 4,150 |
| 232 | 3 | 4,200 | 700 | 4,100 | 1,600 | 2,800 | 2,680 |
| 238 | 3 | 950 | 2,350 | 700 | 800 | 600 | 1,080 |
| 243 | 3 | 400 | 860 | 650 | 450 | 600 | 580 |
| 227 | 4 | 3,600 | 3,800 | 2,800 | 3,900 | 2,800 | 3,380 |
| 232 | 4 | 1,100 | 2,050 | 1,000 | 800 | 3,500 | 1,690 |
| 238 | 4 | 600 | 700 | 550 | 650 | 800 | 660 |
| 243 | 4 | 600 | 450 | 600 | 600 | 650 | 580 |
| 227 | 5 | 900 | 650 | 3,700 | 3,600 | 2,900 | 2,350 |
| 232 | 5 | 650 | 700 | 750 | 800 | 650 | 710 |
| 238 | 5 | 450 | 600 | 700 | 600 | 500 | 570 |
| 243 | 5 | 600 | 550 | 500 | 650 | 650 | 590 |
| 227 | 6 | 4,100 | 800 | 1,050 | 1,100 | 3,800 | 2,170 |
| None | | 3,500 | 3,100 | 3,200 | 2,700 | 2,700 | 3,040 |

Figure 9:
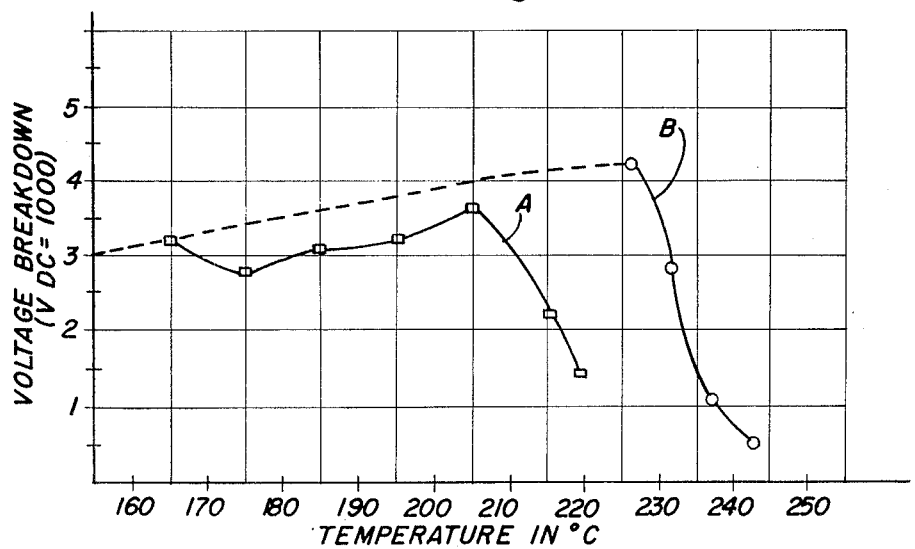
FIG. 9 is a graph illustrating the voltage breakdown characteristics of wound capacitors made in accordance with the present invention as compared to the characteristics of the known prior art capacitors.

Five capacitor samples were used for each treatment in order to obtain a statistically representative sampling. The data shows that for this .02 microfared size capacitor, the optimum breakdown characteristics are obtained by the 3 min. heat treatment at 227° C. The effect of increasing the temperature of treatment while keeping the period constant at 3 min. is graphically illustrated by curve B in FIG. 9 of the drawing. It should be noted that the dotted portion of curve B is merely an assumed curve except that it is known that prior to any heat treatment the voltage breakdown strength of the capacitor is approximately 3,000 volts D.C. and heat treatment at temperatures of less than 155° C. results in no appreciable change in the voltage breakdown strength. Curve A illustrates the voltage breakdown characteristics of similar .02 microfarad capacitors which have been treated at the indicated temperatures for a period of 30 min. in accordance with the aforementioned Peck patent disclosure. Capacitors of sizes other than that chosen would illustrate similar characteristics after treatment in accordance with the Peck patent disclosure. It should be realized also that with the appropriate heat treatment relatively high voltage breakdown strength in the order of 4,000 volts D.C. will be obtained for all of the various sizes of capacitors made in accordance with the present invention including even a ¾ inch diameter ½ microfarad capacitor.

Lead or terminal pull-out tests on the capacitors on which the graph of FIG. 8 is based, resulted in the following data:

| Treatment | | Terminal Pull-out Strength, lbs. |
|---|---|---|
| Temp., C. | Period, Min. | |
| None | None | 1 |
| 165 | 30 | 1.98 |
| 175 | 30 | 2.0 |
| 185 | 30 | 3.6 |
| 195 | 30 | 6.9 |
| 205 | 30 | 15.8 |
| 215 | 30 | 16.3 |
| 220 | 30 | 13.5 |
| 227 | 3 | 15.4 |
| 232 | 3 | 14.8 |
| 238 | 3 | 15.4 |
| 243 | 3 | 14.7 |

The relatively high pull-out strength obtained on the capacitors treated at temperatures of 205° C. and higher results from the fusion of the heat sensitive adhesive coated on the terminals of the capacitors in accordance with the present invention. This represents a great improvement as compared to the pull-out strength of about 4 to 8 lbs. for uncoated lead terminals which is obtained from similarly heat treated planar molecularly oriented linear thermoplastic polyester film capacitors.

An alternate method for making the wound capacitors of the present invention comprises the utilization of a suitable bonding agent such as, for example, benzyl alcohol which is applied to the surfaces of the planar molecularly oriented linear thermoplastic polyester films 11 immediately prior to the enrolling of the interleaved thermoplastic polyester films and metal foils 13. The primary advantage obtained from utilizing such a bonding agent is that the wound capacitor is relatively firm and less fragile prior to the heat treatment thereof, thus facilitating the handling of the capacitors. The heat treatment to which it is subjected should be identical in every respect to that described above.

In order to obtain somewhat more uniform characteristics in the capacitors produced in accordance with the present invention, it has been found that the capacitors can be warmed in a preheating oven at a temperature of approximately 140–145° C. for approximately 3 to 12 minutes prior to being placed in the final heat-treating oven and subjected to the heat treatment at 227–247° C. During the preheating at approximately 140–145° C. no changes in the physical or chemical make-up of the planar molecularly oriented linear thermoplastic polyester films occurs, but the preheating does permit a more uniform distribution of temperature through the capacitor during the heat treatment at the elevated temperatures of 227–247° C. resulting in a more evenly distributed shrinkage of the thermoplastic polyester films 11.

It will now be appreciated by those skilled in the art that we have disclosed electrical capacitors and a method of making the same utilizing planar molecularly oriented linear thermoplastic polyester films and interleaved metal foils, which is compact and sealed from the deleterious effects of moisture, which provides a relatively high capacitance because of the void free construction resulting from the uniform shrinkage of the thermoplastic polyester films, which has a high terminal pull-out strength because of the fusion of the adhesive carried on the terminal to the proper metal foil electrode and the adjacent thermoplastic polyester film, and which is simple and inexpensive to manufacture. While we have disclosed several specific embodiments of the present invention, it is realized that many modifications and variations are possible and will become readily apparent to those skilled in the art from the foregoing description which is intended, therefore, to be illustrative only and the scope of the invention is defined in the appended claims.

Having now particularly described our invention, what we desire to secure by Letters Patent of the United States and what we claim is:

1. A capacitor formed of wound metal foil electrodes and planar molecularly oriented linear thermoplastic polyester films interleaved therewith, said films having the recurrent formula:

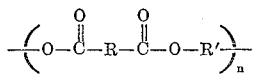

where R stands for a bivalent radical containing the benzene nucleus, and R' stands for a bivalent aliphatic radical containing from 2 to 8 carbon atoms, said capacitor having been subjected to a heat treatment at a temperature of at least 227° C. for a period of time sufficient to partially relax said films in situ, said films on the opposite ends of said capacitor being fused as a result of said heat treatment and said films within said capacitor being less than 50% disoriented as a result of said heat treatment.

2. A capacitor formed of wound metal foil electrodes and planar molecularly oriented linear thermoplastic polyester films interleaved therewith, said films having the recurrent formula:

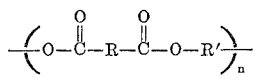

where R stands for a bivalent radical containing the benzene nucleus, and R' stands for a bivalent aliphatic radical containing from 2 to 8 carbon atoms, a first lead terminal extending into said capacitor in electrical contact with one of said electrodes, a second lead terminal extending into said capacitor in electrical contact with another of said electrodes and spaced by at least one of said films from said one electrode, a fused thermoplastic adhesive which fuses at less than 227° C. on said lead terminals bonding said terminals within said capacitor to said electrodes and films respectively adjacent said terminals and in electrical contact with such electrodes, said capacitor having been subjected to a heat treatment at a temperature of at least 227° C. to improve its electrical and physical characteristics, said films being shrunk about said electrodes and at the opposite ends of said capacitor being fused as a result of said heat treatment and said films within said capacitor being less than 50% disoriented as a result of said heat treatment.

3. A method of making an electric capacitor which comprises winding to form a wound unit, interleaved metal foil electrodes and planar molecularly oriented linear thermoplastic polyester films conforming to the recurrent formula:

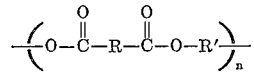

where R stands for a bivalent radical containing the benzene nucleus, and R' stands for a bivalent aliphatic radical containing from 2 to 8 carbon atoms, and heating said wound unit to a temperature of at least 227° C. for a period of time sufficient to bring about substantial shrinkage of said polyester films and disorientation of less than 50 percent of the polyester molecules in said films.

4. The method of making an electric capacitor which is formed of metal foil electrodes and planar molecularly oriented linear thermoplastic polyester films conforming to the recurrent formula:

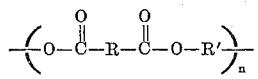

where R stands for a bivalent radical containing the benzene nucleus, and R' stands for a bivalent aliphatic radical containing from 2 to 8 carbon atoms, which method comprises winding said foil electrodes interleaved with said films to form a wound unit, and heating said wound unit to a temperature of at least 227° C. for a period of time sufficient to bring about (a) substantial shrinkage of said films, (b) disorientation of less than 50 percent of the polyester molecules in said films, and (c) fusing of the exposed portions of said films to seal the exposed surfaces of the wound unit.

5. A method of making an electric capacitor utilizing lead terminals having on one end thereof a coating of heat-sensitive plastic material which fuses at a temperature of less than approximately 227° C., which method comprises winding, to form a wound unit, interleaved metal foil electrodes and planar molecularly oriented linear thermoplastic polyester films conforming to the recurrent formula:

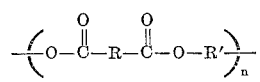

where R stands for a bivalent radical containing the benzene nucleus and R' stands for a bivalent aliphatic radical containing from 2 to 8 carbon atoms, inserting said terminal during said winding with the coded end of each in contact with a different electrode, and heating said wound unit to a temperature of at least 227° C. for a period of time sufficient to bring about: (a) substantial shrinkage of said polyester films, (b) disorientation of less than 50 percent of the polyester molecules in said films, and (c) fusing of said heat sensitive material to fill any voids existing adjacent to the terminals and, upon solidification, to bond said terminals within the wound unit to the electrodes and films in contact with said terminals.

6. The method of making an electric capacitor utilizing lead terminals having on one end thereof a coating of heat-sensitive adhesive, which capacitor is formed of metal foil electrodes and planar molecularly oriented linear thermoplastic polyester films conforming to the recurrent formula:

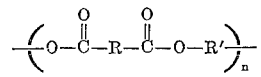

where R stands for a bivalent radical containing the benzene nucleus, and R' stands for a bivalent aliphatic radical containing from 2 to 8 carbon atoms, which method comprises winding said foil electrodes interleaved with said films to form a wound unit, inserting said terminals during said winding with the coated end of each in contact with a different electrode, and heating said wound unit to a temperature of at least 227° C. for a period of time sufficient to bring about: (a) substantial shrinkage of said films, (b) disorientation of less than 50 percent of the polyester molecules in said films, (c) fusing of the ends of said films to seal the exposed portions of said wound unit, and (d) fusing of said adhesive to bond, upon solidification, said terminals within said wound unit to the electrodes and films in contact with said terminals.

7. A method of making an electric capacitor which comprises winding, to form a wound unit, interleaved metal foil electrodes and planar molecularly oriented linear thermoplastic polyester films conforming to the recurrent formula:

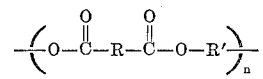

where R stands for a bivalent radical containing the benzene nucleus, and R' stands for a bivalent aliphatic radical containing from 2 to 8 carbon atoms, preheating said wound unit to a temperature of approximately 140–145° C. and then heating said wound unit to a temperature of at least 227° C. for a period of time sufficient to bring about substantial shrinkage in said films and a disorientation of less than 50 percent of the polyester molecules in said films.

8. The method of making an electric capacitor which is formed of metal foil electrodes and planar molecularly oriented linear thermoplastic polyester films conforming to the recurrent formula:

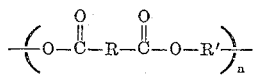

where R stands for a bivalent radical containing the benzene nucleus, and R′ stands for a bivalent aliphatic radical containing from 2 to 8 carbon atoms, which method comprises winding said foil electrodes interleaved with said films to form a wound unit, preheating said wound capacitor to a temperature of approximately 140–145° C. and then heating said wound unit to a temperature of at least 227° C. for a period of time sufficient to bring about: (a) substantial shrinkage of said films, (b) disorientation of less than 50 percent of the polyester molecules in said films, and (c) fusing of the exposed portions of said films to seal the wound unit from moisture and dust.

9. The method of making electric capacitor utilizing lead terminals having on one end thereof a coating of heat-sensitive plastic material which fuses at a temperature of less than approximately 227° C., which capacitor is formed of metal foil electrodes and planar molecularly oriented linear thermoplastic polyester films conforming to the recurrent formula:

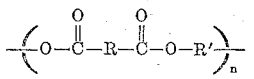

where R stands for a bivalent radical containing the benzene nucleus, and R′ stands for a bivalent aliphatic radical containing from 2 to 8 carbon atoms, which method comprises winding said foil electrodes interleaved with said films to form a wound unit inserting said terminals during said winding with the coated end of each in contact with a different electrode, preheating said wound unit to a temperature of approximately 140–145° C. and then heating said wound unit to a temperature of at least 227° C. for a period of time sufficient to bring about: (a) substantial shrinkage of said films, (b) disorientation of less than 50 percent of the polyester molecules in said films, (c) fusing of the exposed portions of said films to seal the exposed surfaces of the wound unit, and (d) fusing of said material to bond, upon solidification, said terminals within said wound unit to the electrodes and films in contact with said terminals.

10. The method of making an electric capacitor which is formed of metal foil electrodes and planar molecularly oriented linear thermoplastic polyester films conforming to the recurrent formula:

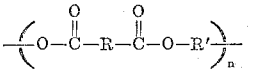

where R stands for a bivalent radical containing the benzene nucleus and R′ stands for a bivalent aliphatic radical containing from 2 to 8 carbon atoms, coating said films with a volatile bonding agent, winding said foil electrodes interleaved with said coated films to form a wound unit having bonded adjacent convolutions, and then heating said wound unit to a temperature of at least 227° C. for a period of time sufficient to bring about: (a) evaporation of said bonding agent, and (b) substantial shrinkage of said films, (c) disorientation of less than 50 percent of the polyester molecules in said films, and (d) fusing of the exposed portions of said films to seal the wound unit from moisture and dust.

11. The method of making an electric capacitor utilizing lead terminals having on one end thereof a plastic coating which fuses at a temperature less than approximately 227° C., which capacitor is formed of metal foil electrodes and planar molecularly oriented linear thermoplastic polyester films conforming to the recurrent formula:

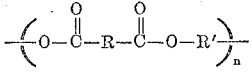

where R stands for a bivalent radical containing the benzene nucleus, and R′ stands for a bivalent aliphatic radical containing from 2 to 8 carbon atoms, which method comprises coating said films with a volatile bonding agent, winding said foil electrodes interleaved with said coated films to form a wound unit having bonded adjacent convolutions, inserting said terminals during said winding with the plastic coated end of each in contact with a different electrode, and heating said wound unit to a temperature of at least 227° C. for a period of time sufficient to bring about: (a) substantial shrinkage of said films, (b) disorientation of less than 50 percent of the polyester molecules in said films, (c) evaporation of said bonding agent, (d) fusing of the exposed ends of said films to seal the ends of said wound unit and (e) fusing of said plastic coating to fill any voids existing adjacent to the terminals and, upon solidification, to bond said terminals within said wound unit to the electrodes and films in contact with said terminals.

12. A method of making an electric capacitor utilizing lead terminals having on one end thereof a plastic coating which fuses at a temperature of less than approximately 227° C., which capacitor is formed of metal foil electrodes and planar molecularly oriented linear thermoplastic polyester films conforming to the recurrent formula:

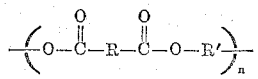

where R stands for a bivalent radical containing the benzene nucleus and R′ stands for a bivalent aliphatic radical containing from 2 to 8 carbon atoms, which method comprises coating said films with a volatile bonding agent, winding said foil electrodes interleaved with said coated films to form a wound unit having adjacent convolutions, inserting said terminals during said winding with the plastic coated end of each in contact with different electrodes, preheating said wound unit to a temperature of approximately 140–145° C. and then heating said wound unit to a temperature of at least 227° C. for a period of time sufficient to bring about (a) substantial shrinkage of said films, (b) disorientation of less than 50 percent of the polyester molecules in said films, (c) evaporation of said bonding agent, (d) fusing of the exposed portions of said films to seal the exposed surfaces of said wound unit, and (e) fusing said plastic coating to bond, upon solidification, said terminals within said wound unit to the electrodes and films in contact with said terminals.

13. The method of making an electric capacitor utilizing lead terminals having on one end thereof a plastic coating which fuses at a temperature less than approximately 227° C., which capacitor is formed of metal foil electrodes and planar molecularly oriented linear thermoplastic polyester films conforming to the recurrent formula:

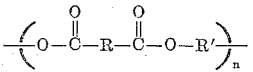

where R stands for a bivalent radical containing the benzene nucleus, and R′ stands for a bivalent aliphatic radical containing from 2–8 carbon atoms, which method comprises winding said foil electrodes interleaved with said films to form a wound unit, inserting said terminals during said winding with the plastic-coated end of each in contact with a different electrode, and heating said wound unit to a temperature of at least 227° C. for a period of time sufficient to bring about: (a) substantial shrinkage of said films, and (b) disorientation of less than 50 percent of the polyester molecules in said films, (c) fusing of said plastic coatings to fill any voids adjacent to the terminals and, upon solidification, to bond said terminals within said wound unit to the electrodes and films adjacent to the terminals, and (d) fusing of the exposed portions of said films to seal the exposed surfaces of the wound unit.

14. In making an electric capacitor of the type which is subjected to a heat treatment at a predetermined temperature to improve the electrical and physical characteristics thereof, and which includes at least two electrodes, each spaced from the other by a dielectric film, and at least two lead terminals, the improvement which comprises coating a plastic material, which fuses at a temperature which is lower than said predetermined temperature, on one of the ends of each of said terminals, inserting said terminals into said capacitor between an electrode and a dielectric film with the coated end of each in contact with a different electrode of the capacitor, and heating said capacitor to a temperature which is in excess of said predetermined temperature for a period of time sufficient to bring about fusing of the coatings of plastic material to fill any voids existing between the electrodes and dielectric films adjacent to the terminals and, upon solidification, to bond said terminals within said capacitor to the electrodes and dielectric films adjacent to the terminals.

15. A terminal for use in a capacitor of the type which is subjected to heat treatment for a predetermined period of time at a temperature in excess of approximately 227° C. to improve the electrical and physical characteristics thereof, said terminal comprising an electrically conductive element having one end which is to be placed within said capacitor in electrical contact with an electrode of said capacitor, a first heat-sensitive plastic coating on said one end, and a second heat-sensitive plastic coating on said one end spaced on said element from said first coating, the plastic of said coatings being of the type which fuses at a temperature of less than approximately 227° C. and, which solidifies upon cooling, whereby as a result of said heat treatment of the capacitor in which said terminal is placed, the plastic coatings fuse, and flow into and fill any air voids existing within the capacitor adjacent to said element and, upon cooling, solidify to bond the element to said electrode within said capacitor.

16. An electric capacitor comprising in combination:
(A) a wound unit formed of metal electrodes interleaved with thermoplastic film which has been heat shrunk about said electrodes at a predetermined temperature to improve the electrical and physical characteristics of the capacitor, and
(B) a terminal including:
  (1) an electrically conductive element having one end which extends into said unit in electrical contact with one of said electrodes and is sandwiched between said one electrode and the adjacent heat shrunk film, and
  (2) a fused plastic adhesive material on said one end of said element filling any air voids existing in the unit adjacent to said element prior to fusing, and bonding said one end of the element to said unit in electrical contact with said one electrode, said adhesive material being of the type which fuses at a temperature lower than said predetermined temperature whereby said adhesive material is fused during the heat shrinking of said film and is confined within the unit by the heat shrunk film.

References Cited in the file of this patent
UNITED STATES PATENTS

| | | |
|---|---|---|
| 2,495,734 | Katzman et al. | Jan. 31, 1950 |
| 2,719,100 | Banigan | Sept. 27, 1955 |
| 2,735,970 | Peck | Feb. 21, 1956 |
| 2,808,357 | Lamphier | Oct. 1, 1957 |
| 2,940,161 | Elarde | June 14, 1960 |